Aug. 2, 1949.  D. SEXTON  2,477,663
PRESSURE TESTING DEVICE
Filed Jan. 8, 1946  2 Sheets-Sheet 1
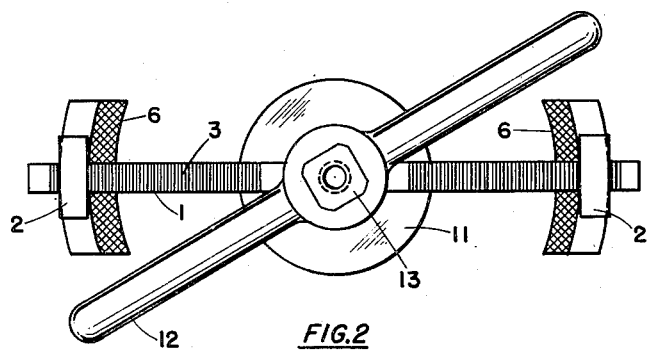
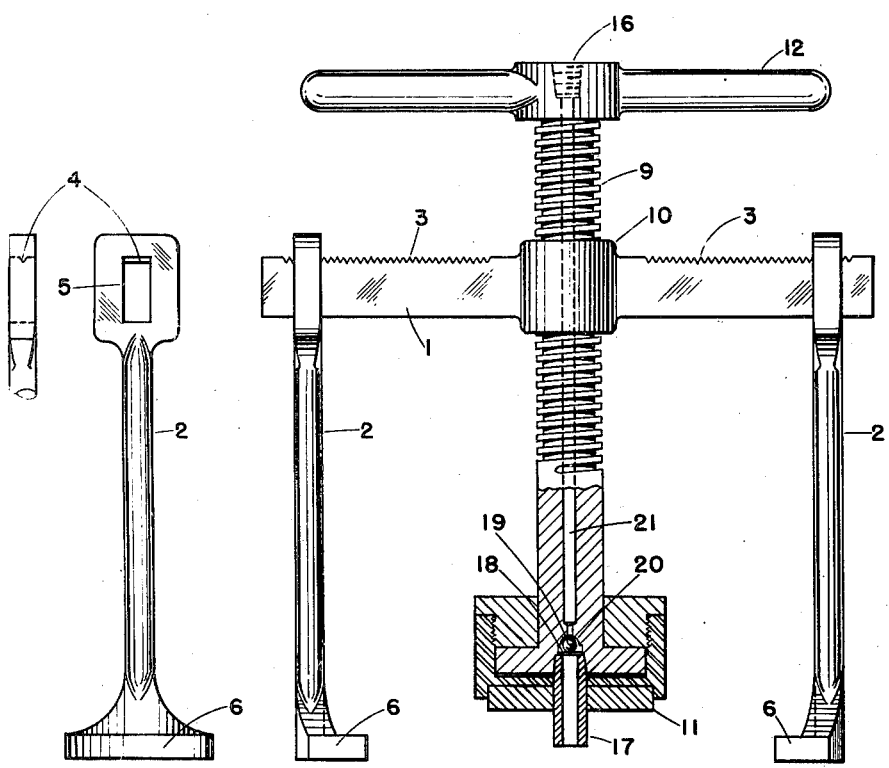
Inventor
DENNIS SEXTON Aug. 2, 1949.     D. SEXTON     2,477,663
PRESSURE TESTING DEVICE
Filed Jan. 8, 1946     2 Sheets-Sheet 2
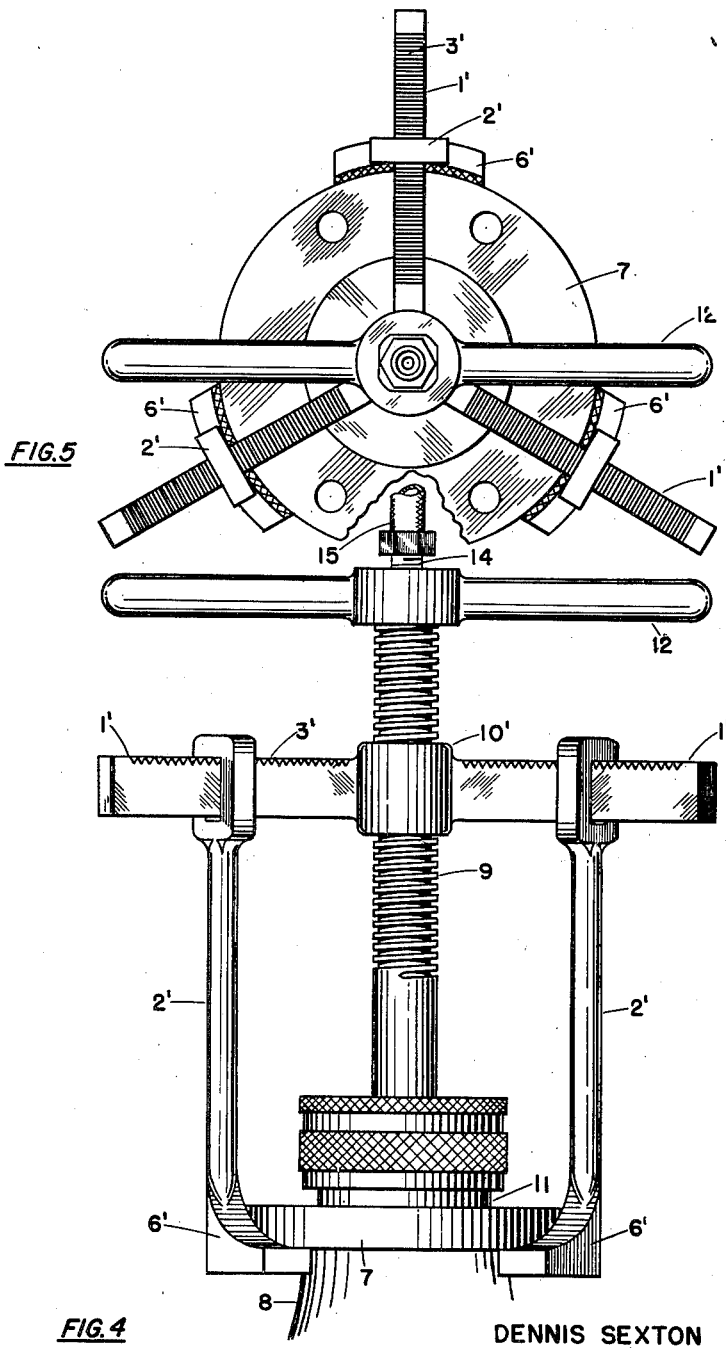
INVENTOR.
DENNIS SEXTON
By M. O. Hayes
Attorney Patented Aug. 2, 1949

2,477,663

UNITED STATES PATENT OFFICE 2,477,663

PRESSURE TESTING DEVICE

Dennis Sexton, Baltimore, Md.

Application January 8, 1946, Serial No. 639,876

3 Claims. (Cl. 138—90)

(Granted under the act of March 3, 1883, as amended April 30, 1928; 370 O. G. 757)

This invention relates to a device for pressure testing valves or other devices and more particularly relates to a pressure testing jig for testing valves and pipe lines or the like.

An object of the invention is to provide a pressure testing device which is adjustable for testing valves or the like of various sizes and is thus substantially universally adapted for testing valves, pipe lines, and the like of different sizes.

A further object of the invention is the elimination of the necessity for providing an assortment of equipment employing flanges and clamps which has been needed heretofore in the testing of valves and the like.

A further object of the invention is the provision of pressure testing device of simple and sturdy construction.

A still further object is to provide a pressure testing device which may be readily mounted and dismantled and which is very simple and easy to operate, permitting very rapid testing.

Other objects will be more apparent from the accompanying description having reference to the drawings which are exemplary and in which:

Fig. 1 is an elevation of a testing device according to the invention.

Fig. 2 is a plan view of the same.

Fig. 3 is a view of the clamping leg of the device.

Fig. 4 is an elevation of a modified form of the invention.

Fig. 5 is a plan view of the modified construction embodying the invention.

Referring to the drawings the numeral 1 represents a horizontal arm provided with rack teeth 3. The horizontal arm supports clamping legs 2. The clamping legs 2 engage the rack 3 by means of a substantially V-shaped toothe 4 provided on the leg 2 and depending from the upper portion of the leg and into a slot or opening 5 provided in the upper portion in the leg. The clamping legs 2 are provided with feet 6 which are placed under the flange 7 of the valve 8 being tested. The valve 8 and its flange 7 are not shown in Fig. 1 but are shown in Figs. 4 and 5, the manner of use and operation of the device being the same in both of the embodiments or modifications shown.

A screw shaft member 9 is threaded into the vertically bored and threaded center portion or hub 10 of the horizontal arm 1. The screw 9 drives the sealing unit 11 which is carried at the lower end of the screw shaft 9. The screw 9 is operated to apply pressure to the sealing unit 11, which engages the flange 7 of the valve or the like, by means of a handle 12 attached to the upper end of the shaft. The handle 12 may desirably have a squared opening receiving a squared end 13 of the screw 9, as seen in Fig. 2.

It will be noted that the screw 9 is drilled and tapped at its upper end 13 as shown at 16 to receive a pipe nipple of the fitting 14 connected to the pressure line 15 as seen in Figs. 1 and 4.

Referring to Figs. 4 and 5, there is here shown an embodiment of the invention employing a three arm spider having racks 3' on the upper edges of its arms 1' and receiving three clamping legs 2', the feet 6' of which engage the flange 7 of a valve or the like 8. The screw 9' is threaded through the hub 10' of the spider 1' in the manner as heretofore described. The handle 12 is mounted as previously described upon the screw shaft 9 carrying the sealing unit 11.

The sealing unit 11 may desirably comprise a rubber sealing gasket at the bottom of the sealing unit, and a nipple 17 extending through the sealing gasket and sealing unit and received in the end of the shaft 9 with a ball retaining washer 18 disposed at the inner end of the nipple and with a ball check 19 and seat 20 disposed in the pressure conduit 21 of the screw shaft 9.

In the use of the device it will be apparent that the sealing unit is turned down into contact with the flange of the valve or the end of the pipe line or other device to be tested. The clamping legs of either form of the invention will then be adjusted inwardly or outwardly along the rack to engage beneath the flange 7 of the particular size of valve 8 being tested. In adjusting the clamping legs inwardly or outwardly along the rack, by reason of the fact that the slot or opening 5 in the clamping legs is of greater depth than that of the arms 1, the clamping legs are lifted to disengage the V-shaped tooth 4 from the rack 3 and are then moved along the rack and dropped into a newly adjusted position on the rack.

After adjusting the clamping legs to the proper position with the feet of the clamping legs engaging beneath the flange of the valve, the handle 12 is turned to firmly clamp the device in sealing contact with the valve or other device to be tested. The apparatus is then in position enabling the pressure testing of the valve or the like by admission of pressure from the pressure line 15 through the screw shaft 9.

The simple mechanical device provided by the present invention is designed to replace more cumbersome methods and assortments of equipment heretofore used in performing such testing operations and provides for more rapid and efficient testing.

It will be understood that various changes and modifications may be made in the construction as shown in the embodiments illustrated without departing from the spirit and scope of the invention, which is only to be limited by the terms of the appended claims.

The invention described herein may be manufactured and used by or for the Government of the United States of America for governmental purposes without the payment of any royalties thereon or therefor.

What is claimed is:

1. In combination in a device for pressure testing of valves or the like, horizontal arm means having a central hub portion vertically bored and threaded, a screw shaft threaded into the central bore of the horizontal arm means, an operating handle mounted at the upper end of said screw shaft and a sealing unit mounted at the lower end thereof, said arms being provided with rack teeth disposed along their upper surfaces, clamping legs having openings in their upper ends and receiving said arm means, said clamping legs having tooth means depending from the upper portion of said legs and into the openings thereof, said tooth means of said legs being disposed in engagement with the teeth of the rack of the horizontal arm means, said clamping legs being adjustable to different positions of engagement along said arms, said clamping legs being provided with clamping feet at their lower ends for engagement with the flange of a valve or the like to be tested, said screw shaft having a bore therethrough providing a pressure conduit leading to said sealing unit and having means providing for connection of a pressure line to said conduit.

2. In combination in a device for pressure testing of valves or the like, horizontal arm means having a central hub portion vertically bored and threaded, a screw shaft threaded into the central bore of the horizontal arm means, an operating handle mounted at the upper end of said screw shaft and a sealing unit mounted at the lower end thereof, said arms being provided with rack teeth disposed along their upper surfaces, clamping legs having openings in their upper ends and receiving said arm means, said clamping legs having tooth means depending from the upper portion of said legs and into the openings thereof, said tooth means of said legs being disposed in engagement with the teeth of the rack of the horizontal arm means, said clamping legs being provided with clamping feet at their lower ends for engagement with the flange of a valve or the like to be tested, said screw shaft having a bore therethrough providing a pressure conduit leading to said sealing unit and having means providing for connection of a pressure line to said conduit, said opening in said clamping legs being of greater depth than the depth of the arm means to permit the clamping legs to be manually lifted and to be slid along the arm means and dropped upon release into engagement with the rack at a newly adjusted position to provide for engagement of the feet of the clamping legs with the particular size of valve or the like being tested.

3. In combination in a device for pressure testing of valves or the like, horizontal arm means having a central hub portion vertically bored and threaded, a screw shaft threaded into the central bore of the horizontal arm means, an operating handle mounted at the upper end of said screw shaft and a sealing unit mounted at the lower end thereof, said arms being provided with rack teeth disposed along their upper surfaces, clamping legs having openings in their upper ends and receiving said arm means, said clamping legs having tooth means depending from the upper portion of said legs and into the openings thereof, said tooth means of said legs being disposed in engagement with the teeth of the rack of the horizontal arm means, said clamping legs being adjustable to different positions of engagement along said arms, said clamping legs being provided with clamping feet at their lower ends for engagement with the flange of a valve or the like to be tested, said screw shaft having a bore therethrough providing a pressure conduit leading to said sealing unit and having means providing for connection of a pressure line to said conduit, said sealing unit including a sealing gasket at the lower end thereof and a nipple extending through the sealing gasket and mounted in the lower end of the screw shaft, a ball retaining washer disposed at the upper end of said nipple, a ball and seat provided in the lower end of said screw shaft in communication with its pressure conduit and overlying said retaining washer.

DENNIS SEXTON.

REFERENCES CITED

The following references are of record in the file of this patent:

UNITED STATES PATENTS

| Number | Name | Date |
|---|---|---|
| 431,939 | Fallon | July 8, 1890 |
| 602,289 | Kemp | Apr. 12, 1898 |

FOREIGN PATENTS

| Number | Country | Date |
|---|---|---|
| 74,812 | Germany | Apr. 25, 1894 |